Sept. 12, 1967  C. B. SMITH  3,341,179
HYDRAULIC JACK TRAILER SUPPORT
Filed July 22, 1964  3 Sheets-Sheet 1
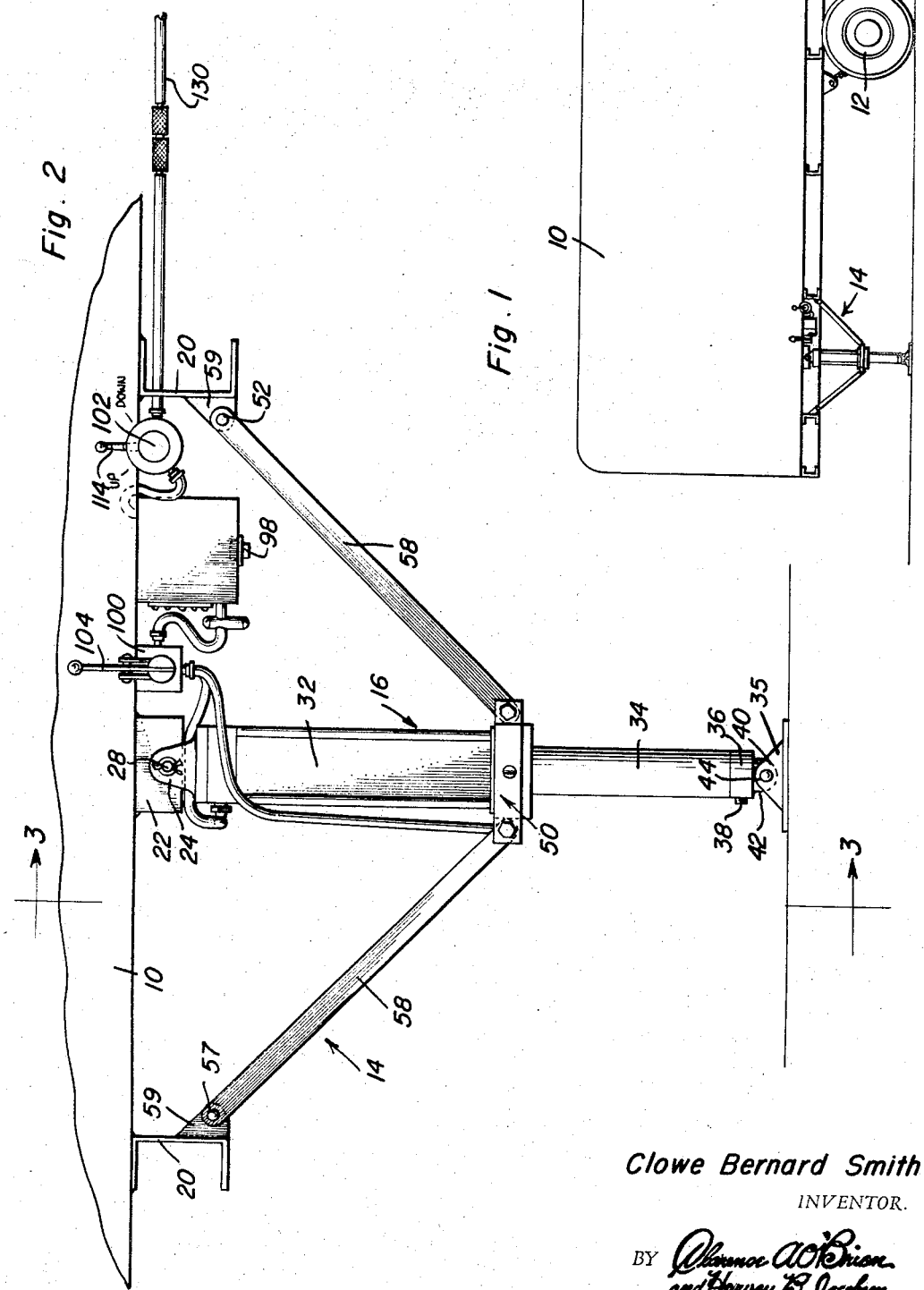
Clowe Bernard Smith
INVENTOR.
BY *Clarence A. O'Brien*
*and Harvey B. Jacobson*
Attorneys

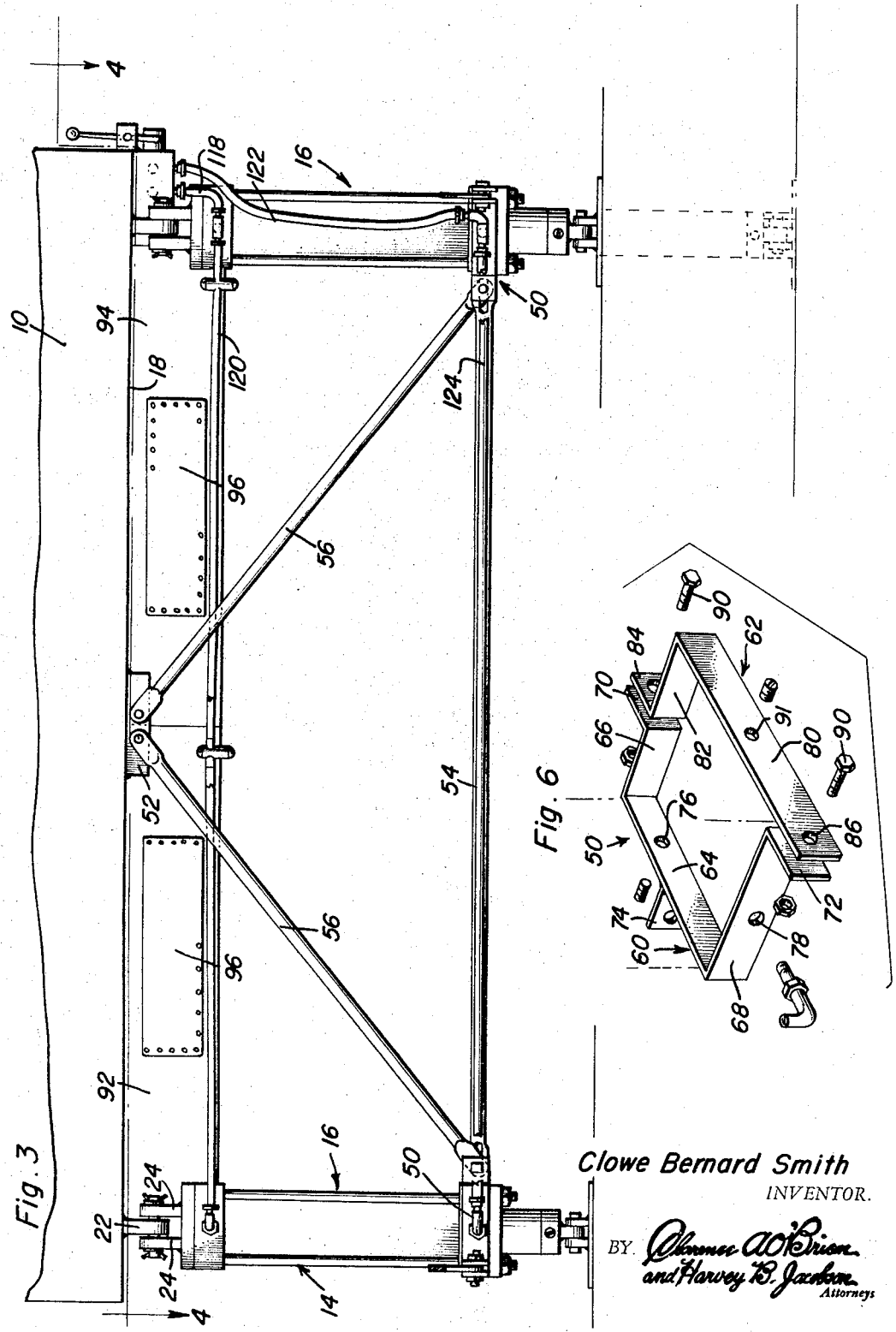

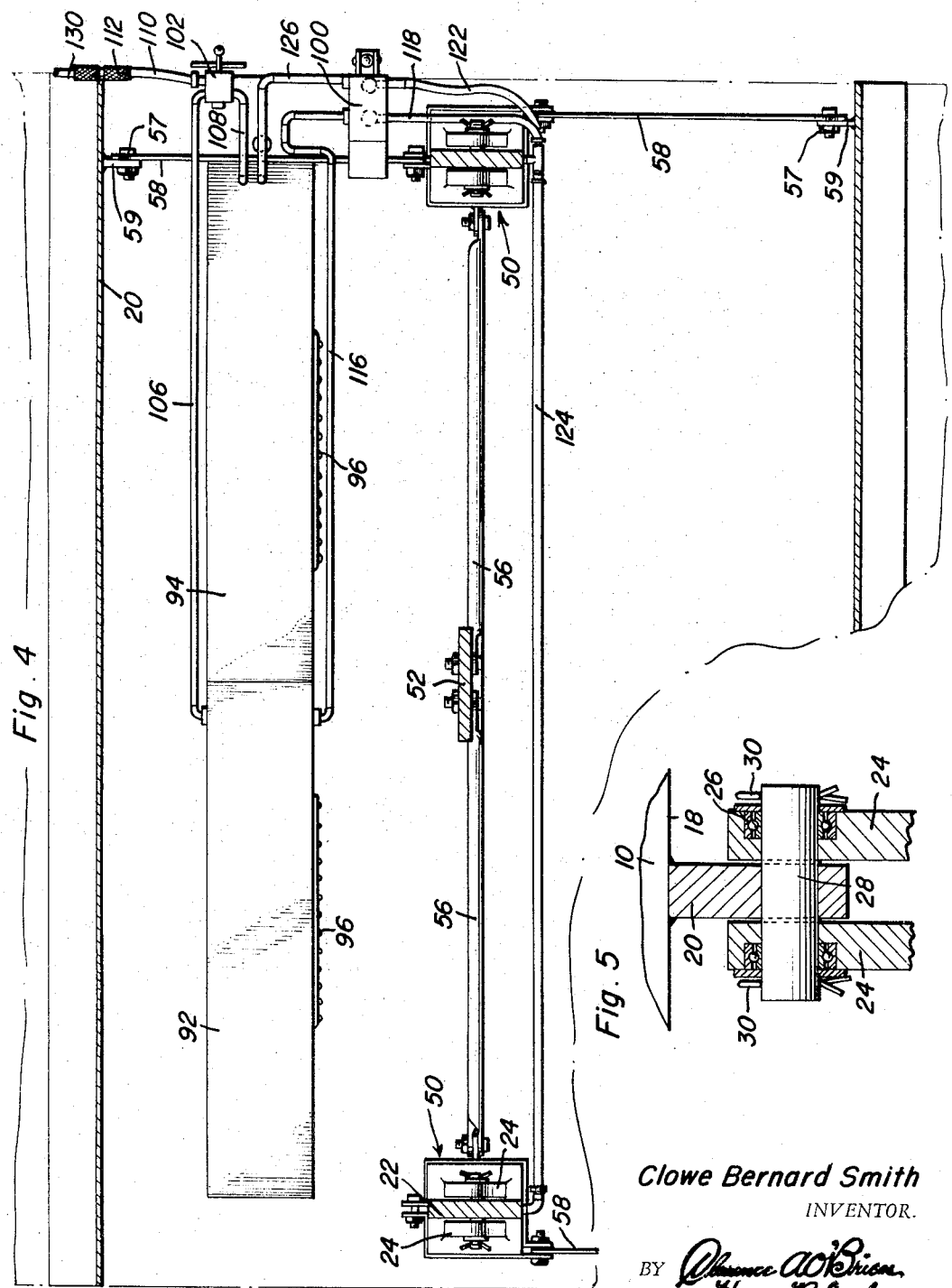

United States Patent Office 3,341,179
Patented Sept. 12, 1967

3,341,179
HYDRAULIC JACK TRAILER SUPPORT
Clowe Bernard Smith, West Monroe, La.,
(910 N. Howard St., Carlsbad, N. Mex. 88220)
Filed July 22, 1964, Ser. No. 384,294
5 Claims. (Cl. 254—86)

This invention comprises a novel and useful hydraulic jack trailer support and more particularly pertains to a hydraulically operated supporting jack leg assembly for trailers.

It is common practice to provide a retractable supporting leg assembly for highway trailers which leg assembly is lowered to support one end of the trailer when the latter is detached from the tractor vehicle which commonly supports the forward end of the trailer and tows the latter. However, owing to the weight of the supporting leg assembly, and the exposure of the latter including its pivotal mounting upon the trailer to the elements especially during inclement weather, considerable difficulty arises in raising or lowering of the supporting assembly as may be necessary. While power operated means have been provided heretofore to effect this purpose including either manually or power operated jack assemblies incorporated into or attached to the supporting leg assembly, their operation has not been entirely satisfactory. It is therefore the primary purpose of this invention to provide a supporting retractable trailer jack leg assembly which shall largely overcome the disadvantages heretofore present.

A further and more specific object of the invention is to provide a pivotally mounted supporting leg assembly for trailers which shall have a bracing means for rigidly retaining the leg assembly in its extended and supporting position by a novel and improved connection to the leg elements of the leg assembly and to the trailer body and in a manner which will greatly rigidify the leg elements of the assembly.

A further object of the invention is to provide a supporting leg assembly for trailers which shall comprise one or more supporting legs composed of telescopingly and slidably connected upper and lower leg sections together with an improved hydraulic operating system for effecting the positive extension of or retraction of the leg sections.

Yet another purpose of the invention is to provide a supporting leg assembly for trailers in accordance with the preceding objects wherein longitudinally adjustable legs consisting of telescoping upper and lower sections is provided, with the upper sections being pivotally mounted upon the trailer body and with the lower sections carrying ground engaging foot elements together with means pivotally mounting the upper sections for swinging movement about a horizontal axis between a raised inoperative position and a lowered operative position and having brace means for rigidly securing the leg elements in their lowered position together with stabilizing brace means connecting the legs to each other to increase the rigidity of the assembly.

More specifically, it is an object of this invention to provide an improved clamp adapted to be embracingly engaged upon each of the leg elements of a foldable and collapsible supporting leg assembly for trailers which clamp assembly will serve to permit ready attachment of transverse and longitudinal brace means for the leg elements while permitting connection of hydraulic lines to the hydraulic mechanism within the leg elements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a trailer showing the jack leg support of this invention in operative position thereon and supporting the forward end of the trailer;

FIGURE 2 is a side elevational view of the invention being an enlargement of a portion of the leg assembly of FIGURE 1;

FIGURE 3 is a view in vertical transverse section taken substantially upon the plane indicated by the section line 3—3 of FIGURE 2 and showing in particular the transverse bracing means of the leg assembly and its connection to the trailer and to the leg elements of the leg assembly;

FIGURE 4 is a view in horizontal section taken substantially upon the plane indicated by the section line 4—4 of FIGURE 3 and showing the arrangement of the conduit elements and other components of the hydraulic operating system of the leg assembly;

FIGURE 5 is a detail view in vertical longitudinal section of the pivotal mounting employed for attaching the jack leg assembly to the trailer body; and FIGURE 6 is a group perspective view of one of the clamping brackets for a jack leg assembly.

Reference being made first to FIGURE 1 it will be observed that numeral 10 designates generally any desired type of trailer having the usual rear wheels 12 while a retractable support means indicated generally by the numeral 14 in the form of a retractable, expansible leg assembly is mounted thereon. As shown in FIGURE 1, the supporting leg assembly 14 serves to support the front end of the trailer when the latter is detached from a tractor vehicle, not shown, of any conventional type.

Reference is now made more specifically to the other figures of the drawings for an understanding of the prefered embodiment of a supporting leg assembly 14 in accordance with this invention.

It will be appreciated that this invention envisions within its scope various arrangements of supporting leg assemblies 14. Thus, it is possible to practice the invention with a leg assembly consisting of but a single leg. Preferably, however, the leg assembly, as illustrated in the accompanying drawings, includes a pair of longitudinally extensible leg elements or jack legs each designated generally by the numeral 16.

Referring now to FIGURES 2 and 3 for comparison, it will be noted that the trailer 10 has a bottom wall or bottom surface 18 together with transversely extending stringers, cross members in the form of channel members 20 which are disposed therebeneath. Pivotal mounting means are provided by which each of the leg elements 16 is swingably secured to the trailer and preferably to the bottom 18 thereof. This pivotal mounting means includes a depending apertured lug 22 welded or otherwise fixedly secured to any convenient portion of the trailer 10 as to the bottom surface 18 thereof, as shown best in the detail view of FIGURE 5. The upper end of each leg element is bifurcated providing parallel apertured ears 24 and either the lugs or the ears are provided with antifriction bearing assemblies as at 26 with a pivot pin 28 extending through the apertures of the lugs and ears and through the bearing assemblies. This pivot pin may be retained as by suitable cotter pin fasteners 30 therein as shown in FIGURE 5 so that the pivotal connection may be readily disengaged when necessary to facilitate mounting or demounting of the leg assembly upon the trailer.

Each leg element 16 is longitudinally extensible and contractible, comprising telescoping upper and lower sections 32 and 34. The upper section 32 comprises a hydraulic cylinder while the lower section 34 comprises a piston slidably received therein. Inasmuch as the structural details of the cylinder and piston in themselves form no part of the invention set forth and claimed hereinafter, and are well known to those skilled in the art, a further description thereof is believed to be unnecessary. It suffices to note that the hydraulic cylinder is double acting, that is, is adapted to receive and discharge hydraulic fluid from either end thereof to effect a positive movement of the piston inwardly or outwardly of the cylinder.

The lower end of the piston 34 has a foot element 35 mounted thereon by means of a retaining cap, bushing or sleeve 36 secured upon the lower end of the piston 34 as by a setscrew or the like 38. The foot member 35 and the retaining means 36 have cooperating interdigitated lugs 40 and 42 which are pivotally connected as by pivot pin 44 which engage and align apertures in the lugs. The same antifriction means shown in FIGURE 5 may be employed at this pivotal connection, if desired.

As so far described, it will be apparent that each of the leg elements 16 is mounted upon a horizontally extending pivot 28 for swinging movement in a vertical plane. Thus, the leg element may be swung to a substantially horizontally extended lifted and inoperative position beneath the bed of the trailer or to a vertically depending lowered and operative position as shown in FIGURES 1-3. By hydraulic operating means to be hereafter set forth, the two telescoping leg sections 32 and 34 may be longitudinally adjusted with respect to each other to cause the foot member 35 to support the forward end of the trailer at various selected levels upon the ground.

An efficient bracing system is provided for rigidly interconnecting the pair of leg elements 16 when the leg assembly includes more than one leg, and for rigidly securing the leg assembly in its lowered operative position. For this purpose a clamp indicated generally by the numeral 50 is detachably secured upon and embraces the lower end of the upper section of each of the leg elements 16. A series of interconnecting braces is releasably connected to the clamps 50. Further, an anchor block 52 is welded or otherwise fixedly secured to the trailer 10 as to the bottom wall 18 thereof in line with and intermediate the pair of leg elements 16 or laterally to one side of a single leg element if only one leg element is employed as the leg assembly. A single rigid horizontally extending transverse brace rod 54 is secured between the pair of transversely spaced leg elements 16, being connected to the clamp 50 as subsequently set forth. At the same time, a pair of diagonal braces each consisting of a rod 56 is pivotally connected at its lower end to one of the clamps 50, and its upper end to the apertured anchor block 52. Thus a triangular bracing is employed for each of the leg elements which establishes a substantially rigid interconnection therebetween.

Referring further to FIGURE 2, it will be seen that in addition to the diagonal transverse braces 56, there are provided a pair of longitudinal diagonal braces each indicated by the numeral 58. The lower end of each brace 58 is secured to one of the clamps 50 while the upper end thereof is secured as by a bolt or other fastener 57 to apertured lugs 59 welded or otherwise secured to the transverse or cross frame members or stringers 20 previously mentioned. In this manner, each leg element 16 is rigidly braced against longitudinal movement by the brace members 58, and against lateral or transverse movement by the brace members 54 and 56. At the same time, the fasteners can be readily disengaged to permit the leg assembly to be swung or folded upwardly to an inoperative position and be thus secured by any desired fastening means, not shown.

Reference is now made more specifically to the structure of the clamp 50 as shown in FIGURE 6. Preferably, each clamp consists of a pair of components designated generally by the numerals 60 and 62. The component 62 is U-shaped consisting of a strap of metal having a straight central web portion 64 together with a pair of side legs 66 and 68. These side legs terminate in parallel, perpendicular and outwardly directed laterally projecting flanges 70 and 72 respectively and which are apertured. Inasmuch as the leg 66 is of less length than leg 68, one side of the component 60 is shorter than the other side. Projecting laterally from a mid portion of the web 64 of the component 60 is an apertured lug 74 for purposes subsequently apparent. In addition, threaded apertures as at 76 and 78 are provided in the component portions 64 and 68 for a purpose to be subsequently apparent.

The other component 62 is L-shaped consisting of a main straight section 80 and having a perpendicularly and laterally extending angulated arm 82 terminating in an apertured outturned flange 84. The free end of the portion 80 is apertured at 86 for registration with an aperture in the flange 72 of the component 60 while the flange 84 is apertured for register with apertured flange 70. Suitable fasteners such as bolts 90 extend through the apertured flange 72 and the aperture 86 of the two components at one side of the clamp and through the apertured flange 84 on the other side of the clamp to thus releasably secure the clamp upon the lower end of the upper section 32 of each leg element 16. A further threaded aperture as a 91 extends through the portion 80 of the component 62, for a purpose to be subsequently apparent.

Reference is now made more specifically to FIGURE 2, 3 and 4 for consideration of the hydraulic operating means of the longitudinal extensible and retractable leg element 16 of the leg assembly 14.

A pair of tank compartments 92 and 94 are conveniently mounted in any suitable place upon the trailer as upon the underside of the floor 18 thereof. These compartments may conveniently be provided with removable access doors or panels each designated by the numeral 96 and may be further provided with drain plugs as at 98, see FIGURE 2. The compartments are intended to contain a sufficient quantity of hydraulic fluid for the hydraulic operating means. Upon any convenient location upon the trailer there are mounted a pair of valve assemblies including a manual control valve 100 and a pressure control valve 102. The control valves are of any conventional type it being merely necessary that they be capable of performing the functions set forth hereinafter. Inasmuch as the structure of the valves in themselves form no part of this invention, and are well known to those skilled in the art, a further description thereof is deemed to be unnecessary.

It suffices for the purposes of this invention that the manual control valve 100 has a manuably operable actuating lever 104 which imparts reciprocatory movement to a valve plunger piston disposed therein. A pair of conduits 106 and 108 connect the pressure supply port and the pressure return or atmospheric vent port of the pressure valve 102 with the tank compartments 92 and 94 respectively. An air pressure inlet conduit 110 is connected to the pressure control valve 102 to supply air pressure thereto and through the valve and conduit 106 to the tank compartment 92. A quick detachable coupling 112 connects the pressure line 110 to any suitable source of air pressure such as a compressor driven by the power plant of the tractor vehicle, not shown. The port 108 vents the pressure within the tank compartment 94 to the atmosphere and the arrangement is such that when the pressure valve actuating handle 114 is shifted between the positions shown in FIGURE 2, it will selectively shut off or vent the interior of the tank compartment 94 to the atmosphere. In this manner pressure from the air pressure source may be selectively applied to the tank compartment 92 for effecting a pressure rising of the hydraulic fluid therein and for selectively venting or releasing the pressure of the tank compartment 94 to the atmosphere.

A delivery line 116 receives pressurized hydraulic fluid from the tank compartment 92 and delivers it to the pressure inlet port of the manual control valve 100. From the latter, a pressure delivery line 118 communicates with a transverse pressure fluid header 120 which connects the upper ends of the hydraulic cylinders 32 of each leg element 16. In a similar manner, a conduit 122 connects the manual control valve 100 with a lower branch conduit 124 which connects the lower ends of the hydraulic cylinders 32. Suitable fittings establish communication between the lower branch conduit 124 and the opening 76 of the brackets to appropriate ports in the lower ends of the hydraulic cylinders. T fittings and L fittings connect the ends of the upper conduits 120 to corresponding ports in the upper ends of the hydraulic cylinders. Finally, a conduit 126 constitutes the return conduit from the manual control valve 100 to the tank compartment 94.

The operation of the hydraulic system is as follows. When the trailer is connected to the tractor vehicle, the slip coupling 112 is connected to the pressure supply line 130 of the tractor. This supplies air pressure to the pressure control valve 102. When the latter is properly manipulated as suggested in FIGURE 2, air pressure is supplied to the tank compartment 92 while the other compartment is vented to the air through the conduit 108. Next, the manual control valve 100 is manipulated so as to apply the pressurized hydraulic fluid from the tank 92 by means of the conduit 116 to either the upper or lower branch conduits 120 or 124 and thus selectively positively longitudinally extend or contract the leg element 16. In a neutral position, the hydraulic conduits are closed, preventing any escape of hydraulic fluid from the cylinders and therefore the leg assembly is locked in adjustably extended position such as that shown in FIGURE 1 or FIGURE 2. During the applying of fluid pressure to the hydraulic cylinder, with the resultant lengthening or shortening of the leg assembly elements 16, hydraulic fluid is discharged from the other end of the hydraulic cylinder through the return conduit either 118 or 122 depending upon the direction of movement of the leg element pistons, with the returning fluid being discharged into the tank 94 whose pressure is vented to the atmosphere through the pressure control valve 102 as previously mentioned.

Referring again to FIGURES 2, 3 and 6, it will be understood that the adjacent ends of a diagonal and transverse braces 56 and 54 are secured to opposite sides of the apertured lugs 74, while the two diagonal longitudinal braces 58 of each leg element are secured to the apertured lugs formed by the flange 72 and the aperture 86 at one side of the bracket and the two apertured flanges 70 and 84 upon the other side thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer retractable supporting means comprising a leg assembly mounted upon a trailer and projecting downwardly below the trailer bed, said leg assembly including longitudinally telescoping, upper and lower leg sections, said upper leg section comprising a hydraulic cylinder, mounting means securing the cylinder upper end to said trailer, said lower leg section including a piston slidable in said cylinder and a ground engaging foot member, hydraulic actuating means connected to said cylinder at opposite ends of said piston and effecting positive movement of the latter inwardly and outwardly of said cylinder, said actuating means comprising hydraulic fluid tank means, conduits connecting said tank means to said cylinder at opposite ends of said piston, a control valve reversibly and alternately connecting said conduits to said tank means, a source of air pressure, pressure valve means selectively connecting said tank means to said source and venting said tank means to the atmosphere.

2. The combination of claim 1 including a quick-detachable coupling connecting said source to said tank means.

3. The combination of claim 1 including brace means connected to said upper sections and to said trailer, said brace means comprising clamps secured to and embracing said upper section at one of said opposite ends, said clamps having apertures therethrough, said hydraulic actuating means including conduits extending through said apertures and communicating with the interior of said upper section.

4. In combination with a fluid operated piston device pivotally anchored to a frame brace element connected to the frame and extending from the piston device in substantially perpendicular directions, fluid conduit means for supplying fluid under pressure to said piston device and a clamp assembly securing said brace elements to the piston device and coupling the conduit means thereto, said clamp assembly including, a first clamp member having spaced flanges of unequal length, a pivot joint connecting one of the brace elements to the first clamp member between said spaced flanges thereof, a second clamp member having portions abutting the spaced flanges of the first clamp member to embrace the piston device, fastener means interconnecting the other brace elements and said portions of the second clamp member with the respective flanges of the first clamp member and a fitting extending through one of said clamp members connecting the conduit means to the piston device.

5. In combination with a fluid operated piston device pivotally anchored to a frame, brace elements connected to the frame and extending from the piston device in substantially perpendicular directions, fluid conduit means for supplying fluid under pressure to said piston device, a clamp assembly securing said brace elements to the piston device and coupling means extending through the clamp assembly connecting the conduit means to the piston device.

References Cited

UNITED STATES PATENTS

| | | | |
|---|---|---|---|
| 1,290,265 | 1/1919 | McEntire | 91—4 |
| 2,523,152 | 9/1950 | Seyferth | 254—86 |
| 2,837,312 | 6/1958 | Troche | 254—86 |
| 2,875,980 | 3/1959 | Grace | 254—86 |
| 3,081,065 | 3/1963 | Dalton | 254—86 |
| 3,100,965 | 8/1963 | Blackburn | 91—4 X |
| 3,169,012 | 2/1965 | Fagan | 254—86 |

OTHELL M. SIMPSON, *Primary Examiner.*